United States Patent [19]

Egleston et al.

[11] 3,956,975

[45] May 18, 1976

[54] PACKAGING METHOD AND APPARATUS

[75] Inventors: Harry B. Egleston, Livonia; Robert E. Lisiecki, Orchard Lake; Duncan J. Crawford, Franklin; Eric A. Braun, Northville; Earl W. Walke, Jr., Oak Park, all of Mich.

[73] Assignee: Ex-Cell-O Corporation, Detroit, Mich.

[22] Filed: Mar. 19, 1975

[21] Appl. No.: 559,848

Related U.S. Application Data

[62] Division of Ser. No. 420,427, Nov. 30, 1973, Pat. No. 3,905,280.

[52] U.S. Cl. .............................. 93/49 M; 53/375; 93/DIG. 1; 93/44.1 R; 156/73.1
[51] Int. Cl.² .................................................. B31B 1/66
[58] Field of Search................ 93/44.1 R, 44.1 GT, 93/49 M, 49 R, DIG. 1; 53/186, DIG. 2, 371, 373, 374, 375, 379; 310/8.3; 156/73.1, 580

[56] References Cited
UNITED STATES PATENTS

| | | |
|---|---|---|
| 3,224,915 | 12/1965 | Balamuth et al.................. 156/73.1 |
| 3,239,995 | 3/1966 | Monroe et al................. 93/44.1 GT |
| 3,241,291 | 3/1966 | Monroe et al................... 53/375 X |
| 3,468,731 | 9/1969 | Obeda............................... 156/73.1 |
| 3,507,095 | 4/1970 | Kuhnle............................ 93/44.1 R |

Primary Examiner—James F. Coan
Attorney, Agent, or Firm—Reising, Ethington, Barnard, Perry & Brooks

[57] ABSTRACT

Apparatus and method for forming sealed joints by welding layers of thermoplastic coated paperboard together. One outer surface of the paperboard layers is placed in engagement with back-up means, and the opposite outer surface of the paperboard layers is engaged by vibrating means so that the thermoplastic coating of the paperboard is heated by the vibration to weld the layers together. The apparatus and method is particularly useful in forming sealed joints for paperboard cartons, such as milk cartons of the type shown, for example, in U.S. Pat. No. 3,309,841. The vibrating means may be an ultrasonic transducer of the type disclosed in U.S. Pat. No. 3,526,792, for example.

14 Claims, 11 Drawing Figures

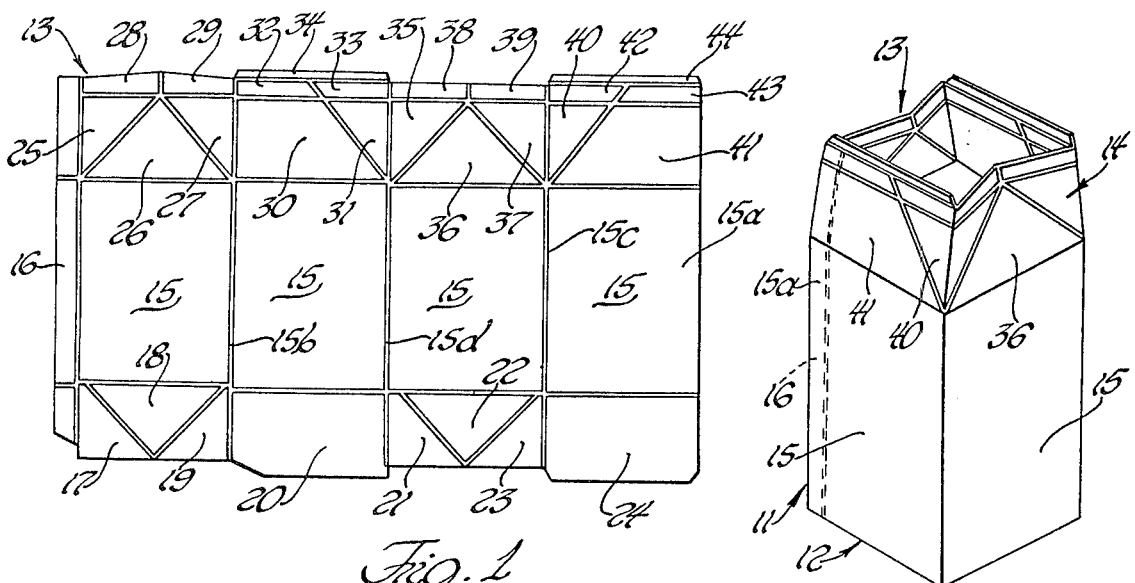
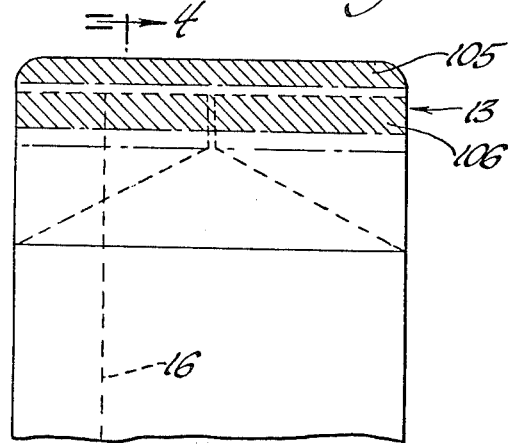
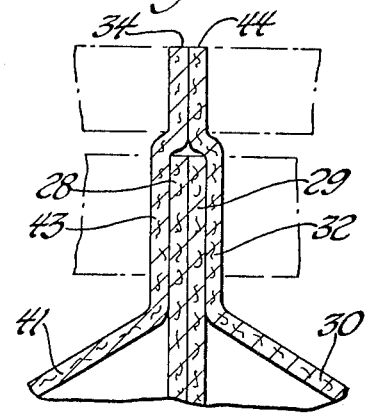
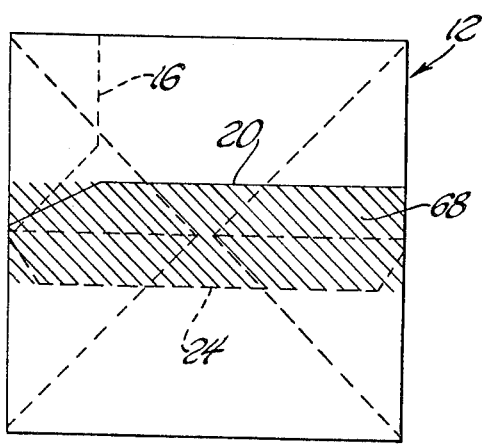
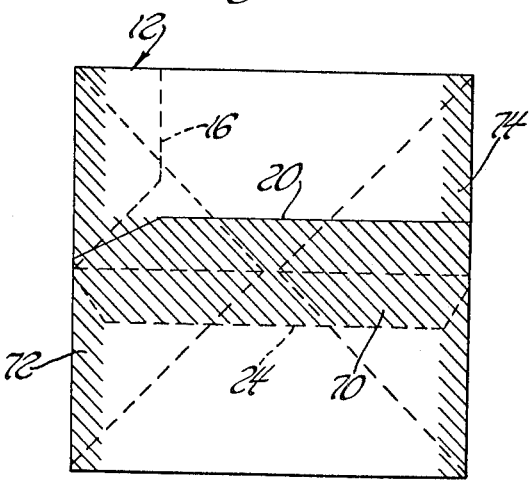

PACKAGING METHOD AND APPARATUS

This is a division of application Ser. No. 420,427, filed Nov. 30, 1973, now U.S. Pat. No. 3,905,280.

This invention relates generally to packaging methods and apparatus, and is particularly concerned with methods and apparatus for welding together layers of thermoplastic coated paperboard or the like to form a liquid-proof joint, as well as with methods and apparatus for forming from flat blanks containers having tubular bodies with end closures at opposite ends of the tubular bodies, and for closing and sealing the side seams and end closures to render the containers moisture proof and capable of holding liquids without leakage.

The type of container with which the present invention is particularly (but not exclusively) concerned is the type made of paperboard stock coated on both sides with a thermoplastic material such as polyethylene. The thermoplastic coating on the paperboard is utilized not only as a moisture proofing material, but also serves as a heat and pressure sensitive adhesive which cooperates in sealing the seams, joints and closure elements of the container so as to make the container fluid-tight when it is filled with milk or other liquid contents, and sealed and closed. An example of this general type of container is disclosed in U.S. Pat. No. 3,309,841.

The conventional manner of sealing such containers is to bring portions of the thermoplastic coated container into contact with each other, and, by the application of a considerable amount of heat, sufficient to melt the thermoplastic coating, to weld the two surfaces together. When the thermoplastic material subsequently cools and sets, the two surfaces are sealed and adhesively secured together. Such methods require the use of a considerable amount of heat energy, which in turn requires elaborate methods and systems for dissipating the heat from the plant in which the packaging operation is being carried out. Other examples of this general type of packaging apparatus are shown in U.S. Pat. Nos. 3,002,328; 3,166,994; 3,187,647; 3,239,995 and 3,309,841.

An object of this invention is to provide apparatus for welding together at least two layers of thermoplastic coated paperboard or the like wherein mechanical energy is converted into localized heat energy to perform the welding operation to minimize the amount of heat energy required, and to eliminate the necessity for elaborate systems and methods for dissipating the excess heat.

A further object is to provide packaging apparatus for closing and sealing containers of thermoplastic coated paperboard, or similar material on a production basis by using ultrasonic transducers to provide the energy to weld the layers of the carton together at the joints to be sealed.

A further object is to provide a method and apparatus for forming from a flat blank a container of the type having a tubular body with end closures at opposite ends of the tubular body by first welding overlapping edges of the blank together to form a side seam so that the blank can be formed into tubular configuration, folding one end closure to a flat closed condition in overlapping layers and welding the overlapping layers together, and then, after filling the container, folding the panels and layers of the other end closure to a closed condition and welding the layers together in the closed condition.

In accordance with the present invention, apparatus is provided for welding layers of thermoplastic coated paperboard or similar material together to form a sealed joint between the layers. The apparatus includes back-up means engageable with one outer surface of the paperboard layers, and vibrating means engageable with the opposite outer surface of the paperboard layers so that the mechanical energy of the vibrating means is converted into frictional heat to cause the thermoplastic material to melt and thereby weld the layers together.

The vibrating means may be a sonic welding device, and may be an ultrasonic transducer of the type shown in U.S. Pat. No. 3,526,792 having a converter for converting electrical energy into mechanical energy, and a concentrating horn for concentrating the mechanical energy into vibrations at a desired frequency.

The back-up means comprises a support compatible with the layers of material to be welded together so that there is a substantially uniform distribution of pressure when the back-up means engages one outer surface of the layers, and the horn of the vibrating means engages the opposite outer surface. When the vibrating means is energized, the vibration of the horn creates frictional heat to weld the layers of material together.

The invention includes a method and apparatus for forming from a flat blank, a container of the type having a tubular body with end closures at opposite ends of the tubular body. In the illustrated embodiment, the container is of the type shown, for example, in U.S. Pat. No. 3,002,328 wherein one end closure is flat, and the other end closure is of so-called "gabled" configuration that can be opened in such a manner as to form a pouring spout. The container blank is wrapped around a side seam mandrel with the longitudinal edges of the blank overlapping, and the overlapping edges are sonically welded together so that the blank can assume a tubular configuration. The tubular blank is placed on a mandrel with one end projecting therefrom for engagement by flat end closure means operable to fold the projecting end to a flat closed condition in overlapping layers against the end of the mandrel. The overlapping layers are then sonically welded together. The container is then transferred to a conveyor and moved through a welding station where the other end closure (after the container is filled) is closed by a mandrel and sonic welding horn and welded together.

Other objects, advantages and features of the invention will become apparent from the following description taken in connection with the accompanying drawings in which:

FIG. 1 is a plan view of a conventional thermoplastic coated paperboard blank for use in forming a container of the type that can be erected, filled and sealed in accordance with the apparatus and method of this invention;

FIG. 2 is a perspective view of a container formed from the blank of FIG. 1 with the gabled end closure portion in the open, unsealed position after a conventional prebreaking operation;

FIG. 3 is a side elevational view of the gabled end closure portion of the container of FIG. 4 in its closed, sealed condition;

FIG. 4 is a sectional view taken on lines 4—4 of FIG. 3 with the vibrating welding means and back-up means illustrated in phantom lines in their operable positions to perform the welding operation on the gabled end closure portion of the illustrated container;

FIG. 5 is a bottom plan view of the container illustrating one sealing pattern of the flat end closure of the illustrated container;

FIG. 6 is a view similar to FIG. 7 illustrating another sealing pattern of the bottom of the container;

Figure 7:
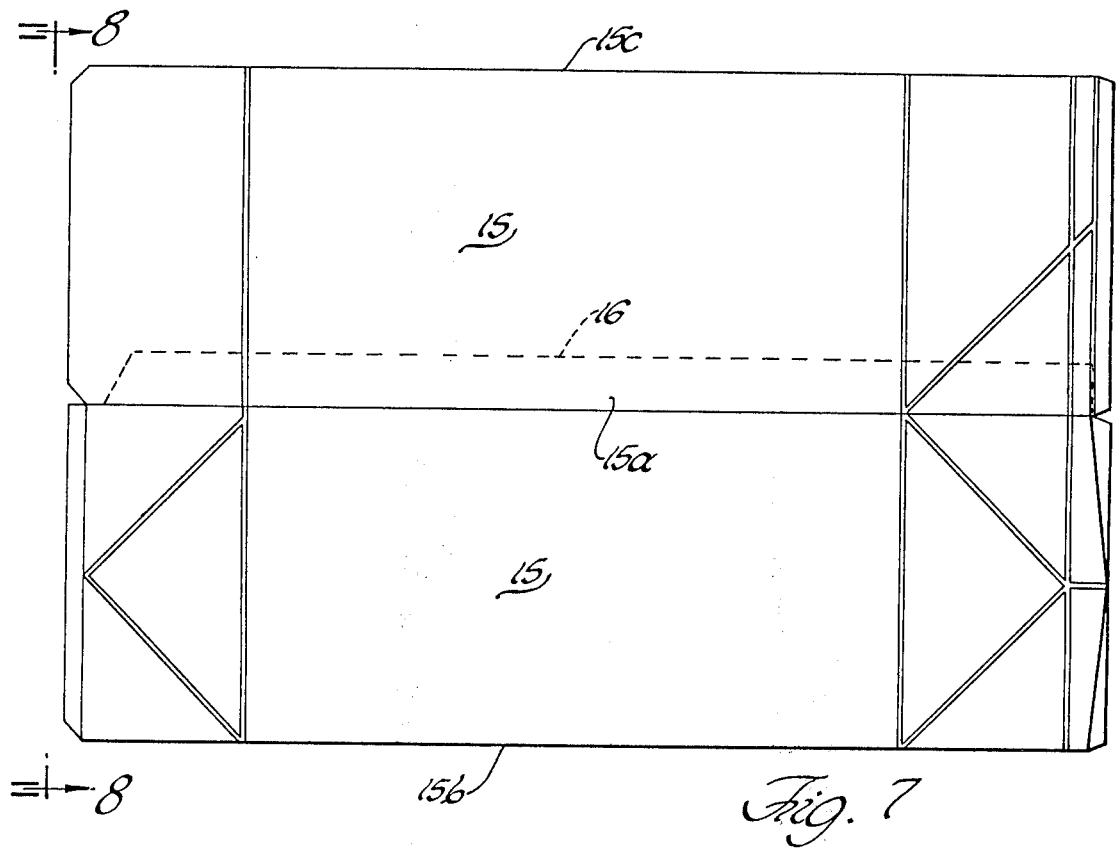
FIG. 7 is a plan view of the container blank of FIG. 1 wrapped around a side sealing mandrel with the edge of the sealing flap and opposite outer side panel overlapping to form a side seam when welded together.

With reference first to FIGS. 1 and 2, reference numeral 11 collectively designates the container in its erected condition in FIG. 2, the container being made from the blank of FIG. 1. The container blank of FIG. 1 is preferably made up of paperboard provided with a thermoplastic coating such as polyethylene on both sides.

As shown in FIG. 2, the container 11 is in the form of a tubular body of rectangular cross-section having end closures 12 and 13 at opposite ends of the tubular body. In the illustrated embodiment, the end closure 12, in its closed condition, is flat and constitutes the container bottom, while the end closure 13 is located at the upper end of the container body and is of gabled configuration. The top end closure 13 is formed with an extensible pouring spout 14 for use in dispensing the contents of the container 11.

The container of FIG. 2 is formed from the blank of FIG. 1, the blank being divided into a plurality of panels which are adapted to form the walls and the closure members of the container. The panels are formed by score lines. The body portion of the container 11 is formed by four side panels 15, which panels are secured together by a side seam flap 16.

The bottom closure portion 12 is formed from the various rectangular and triangular panels 17, 18, 19, 20, 21, 22, 23 and 24. When the carton is folded along the score lines between the side panels 15, and the sealing flap 16 is welded to the inner surface of one of the side panels 15 as illustrated in FIG. 2, the triangular panels 18 and 22 are folded inwardly with the panels 17 and 19 overlying the panel 18, and the panels 21 and 23 overlying the panel 22. The edge of the panel 24 is then inserted beneath the edge of the panel 20 in the space between the panel 20 and the panels 19 and 21 to form the flat bottom 12 which is illustrated in bottom plan views in FIGS. 5 and 6. The bottom is sealed in FIGS. 5 and 6 by the apparatus shown in FIG. 11 in the manner set forth in greater detail below.

The top end closure 13 of the container 11 is formed with a pair of roof panel members which are inclined upwardly in the completed position and between which are disposed the inner triangular panels 26 and 36. One of the roof panel members is formed from the panels 30 and 31, and the other of the roof panel members is formed from the panels 40 and 41. A pair of triangular fold-back panels 25 and 27 are disposed on opposite sides of the inner triangular panel 27, and similarly, a pair of triangular fold-back panels 35 and 37 are disposed on opposite sides of the inner triangular panel 36. The inner triangular panel 36 and the adjacent fold-back panels 35 and 37 function as an extensible pouring spout 14 after the top end panels have been closed. The closure panels 25, 26 and 27 are provided on the upper end thereof with inner rib panels 28 and 29. The inner closure panels 35, 36 and 37 are provided with inner rib panels 38 and 39 on the upper ends thereof. The outer closure panels 30, 31, 40 and 41 are provided on the upper ends thereof with outer rib panels 32, 33, 42 and 43, respectively. The outer rib panels 32 and 33 are provided with an upwardly extending sealing panel 34. The outer rib panels 42 and 43 are provided with an upwardly extending sealing panel 44.

As shown in FIGS. 3 and 4, the top end closure 13 is closed and sealed by welding the opposed surfaces of the sealing panels 34 and 44 together as well as the opposed surfaces of the panels 28, 29, 32 and 43 together by heating the thermoplastic coating on the opposed surfaces to cause the coatings of the panels to flow together so that the panels will be welded together upon cooling of the thermoplastic coatings. The welding and sealing operation of the top end closure is carried out by the apparatus of FIG. 11 in the manner set forth in detail below.

Figure 8:
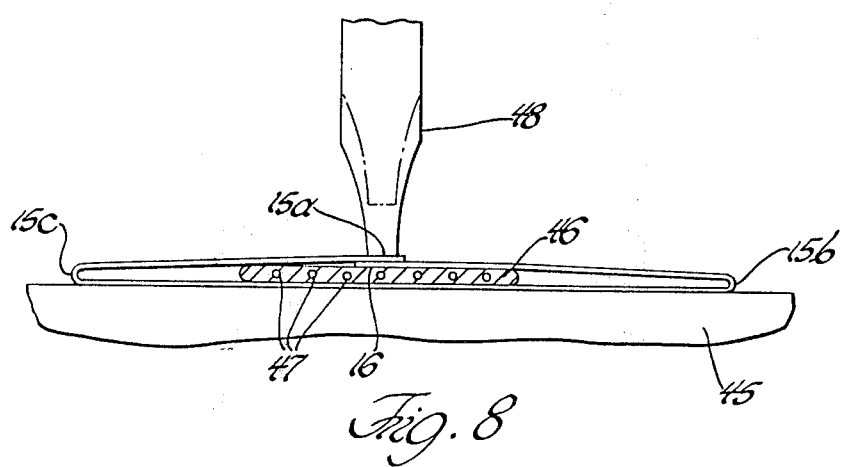
FIG. 8 is a view taken on lines 8—8 of FIG. 7.

FIGS. 7 and 8 illustrate a side seam welding operation wherein the side seam flap 16 (defining one side edge of the container blank) is sealed to the edge 15a (defining the other side edge of the blank) of the outer side panel 15 opposite the side panel 15 from which the side seam flap 16 extends. As shown in FIG. 8, the flat container blank of FIG. 1 is supported on a support 45 and is wrapped around a side seam mandrel 46 with the side edges 15a and 16 overlapping. In the illustrated embodiment of FIG. 8, the mandrel 46 is in the form of a flat plate-like member having a plurality of passages 47 for circulating coolant fluid through the mandrel. The thickness of the mandrel 46 is such that it is receivable in the space between the layers of the container blank when the blank is folded about the score lines 15b and 15c with the blank in a substantially flat folded condition when the edges 15a and 16 overlap as illustrated in FIG. 8.

When the container blank is wrapped around the side seam mandrel 46 as illustrated in FIG. 8, the outer surface of the overlapping edges 15a and 16 is engaged with side seam vibrating means 48 which comprise a concentrating horn of an ultrasonic transducer of the type shown in U.S. Pat. Nos. 3,432,691 and 3,526,792, wherein electrical energy is converted into mechanical energy. The horn 48 converts the mechanical energy into vibrations at a desired frequency. When the horn 48 engages the outer surface of the overlapping edges 15a and 16, as shown in FIG. 8, it is caused to vibrate at a frequency that, within a predetermined time, generates heat sufficient to cause the thermoplastic coatings at the opposed surfaces of the edges 15a and 16 to flow. When the horn 48 is caused to stop vibrating, the thermoplastic material cools and sets to weld the edges 15a and 16 together to form a side seam for the container. The passages 47 are connected with a source of fluid or liquid coolant which continuously cools the surface of the mandrel 46 to increase the rate at which the thermoplastic material cools and sets to form the side seam between edges 15a and 16.

The horn 48 is mounted for movement from an upper inoperable position illustrated in phantom lines in FIG.

8, and the lower, operable position illustrated in full lines in FIG. 8 in which it is engageable with the outer surface of the side edge 15a.

The sequence of the side seam welding operation illustrated in FIG. 8 may be to (1) bring the container blank in its completely unfolded condition to the position located beneath the horn 48 and the mandrel 46 with the center score line 15d between the inner side panels 15 centered along the length of the mandrel, (2) wrapping the outer side panels 15 around the mandrel 46 by folding the outer side panels about the score lines 15b and 15c until the edges 15a and 16 overlap each other at the center of the mandrel 46, and (3) bring the vibrating horn 48 to its operable position in engagement with the overlapping side edges 15a and 16. When the horn engages the outer surface of the overlapping edges 15a and 16, it is energized to vibrate for a time sufficient to cause the thermoplastic material between the overlapping layers to flow. The horn then stops vibrating but remains in contact with the overlapping layers to apply pressure until the thermoplastic material cools and sets, after which the horn 48 moves to its inoperable position and the now side seamed container blank is removed from the mandrel 46. The same sequence of operation may be employed in the operations closing the flat end closure 12 and the gabled end closure 13 with the apparatus described below.

With the horn 48 designed to vibrate at a frequency of 20,000 cycles per second, for each welding operation on the thermoplastic coated paperboard illustrated, a vibration time of from about 0.1 to 0.5 seconds will be required to cause the thermoplastic to flow. Following the vibration time of from 0.1 to 0.5 seconds, the horn 48 may be held in contact with the layers 15a and 16 for a period of from about 0.5 to 1.5 seconds to allow the thermoplastic material to cool and set to complete the seal along the side seam. The setting time is accelerated by the amount of cooling provided by the flow of water or other cooling fluid or liquid in the passages 47. The foregoing specific figures regarding the vibrating frequency and time, as well as the setting time of the thermoplastic material at the seam, are given by way of example only, and may vary depending upon the area to be welded together, the thickness and number of layers to be welded together, and the amount of cooling provided by the coolant in passages 47 of the mandrel 46.

Figure 9:
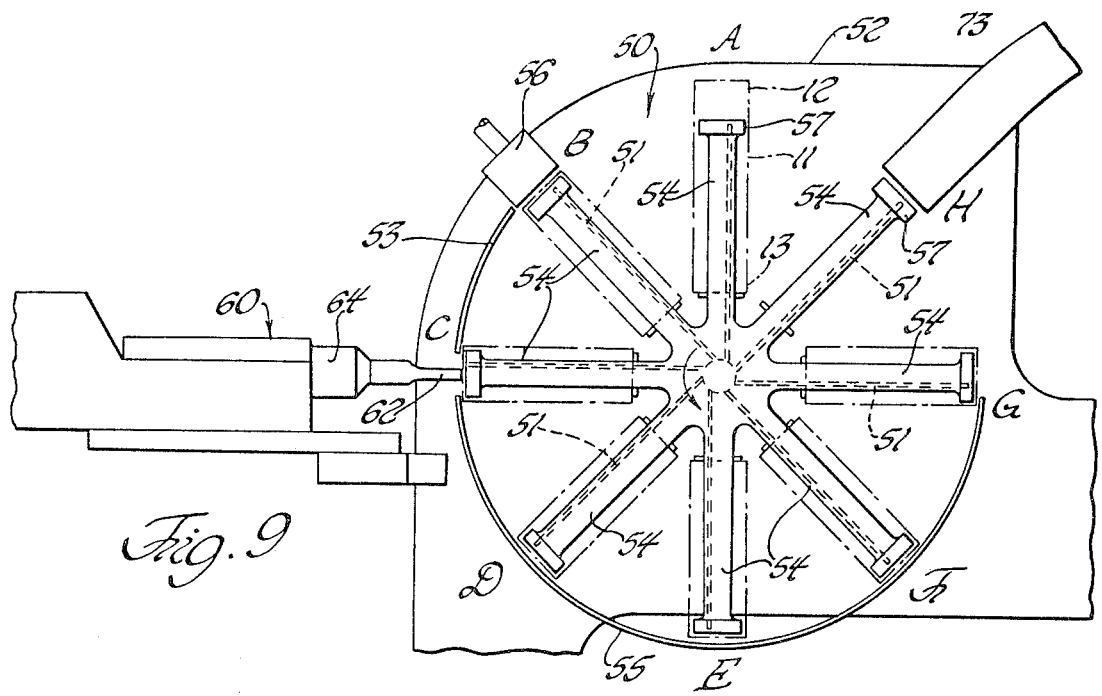
FIG. 9 is an elevational view of packaging apparatus incorporating the invention at the container flat end closure closing station thereof.

FIG. 9 illustrates a rotatable mandrel assembly 50 supported on a frame 52. The mandrel assembly 50 includes a plurality (in this case, eight) of radially extending arms, or mandrels 54. The mandrel assembly 50 is intermittently driven to rotate in a counterclockwise direction as viewed in FIG. 9 so that each arm or mandrel 54 sequentially moves from a loading station at position A, a flat end closure or bottom breaking station at position B, a welding station at position C, and from position C through positions D, E, F and G to an unloading or transfer station at position H. Located at position B is a flat end closure breaker unit, or in the instant case a bottom breaker unit since the flat end closure defines the bottom of the illustrated container designated collectively by reference numeral 56 for folding the bottom panels of the bottom closure portion 12 to the closed condition illustrated in FIGS. 5 and 6. The bottom breaker unit 56 is diagrammatically illustrated in FIG. 9 and may be of the construction shown in U.S. Pat. No. 3,239,995. Similarly, the rotatable mandrel assembly 50 may be of the same construction as that shown in the apparatus disclosed in U.S. Pat. No. 3,239,995.

As is disclosed in the aforementioned U.S. Pat. No. 3,239,995, the cartons 11 may be loaded onto apparatus in flat blank form with the sealing flap 16 already adhesively secured to the inner surface of the appropriate side panel 15 to form the side seam between side edges 15a and 16. The flattened, closed blank, is then formed into tubular configuration by apparatus such as that disclosed in U.S. Pat. No. 3,239,995, and the tubular cartons with both the bottom and top closure portions 12 and 13 in the fully open positions, are sequentially loaded onto the mandrel 54 located at position A with the top closure portion 13 disposed downwardly toward the axis of rotation of the rotatable mandrel assembly 50, and the bottom closure portion 12 projecting radially outwardly from the outer end of the mandrel 54.

When a carton is loaded onto the mandrel 54 at position A, the assembly 50 is indexed to rotate in a counterclockwise direction (as viewed in FIG. 9) to carry the mandrel 54 formerly located at position A to position B. When a loaded mandrel 54 is moved from position A to position B, the bottom breaker indicated schematically at 56 in position B folds the bottom panels 17–24 to the closed position shown in FIGS. 5 and 6 in the manner described in U.S. Pat. No. 3,239,995 as well as U.S. Pat. No. 3,120,089. The panels are folded along the score lines and the bottom breaker unit 56 operates to effect substantial prebending of the bottom closure panels on their respective score lines to their closed position. The prebending action is carried to a sufficient extent to create along each score line, insofar as possible, a permanent set in the paperboard and its thermoplastic coating.

The end of each of the mandrels 54 have a shape corresponding to the closed bottom 12 of the container 11. Thus, the end of each of the mandrel arms 54 serves as a back-up means for the welding and sealing operation that takes place at position C as described below.

When a carton 11 is moved from position B to position C with the bottom closure portion 2 in its folded and closed condition, it is disposed in opposed relationship to vibrating means 62 which is operable to engage the outer surface of the layers of the bottom panels, and the mechanical energy of the vibrating means 62 is converted into frictional heat to weld the layers together along the area in contact with the vibrating means 62. A hold-down rail 53 extends between positions B amnd C and engages the folded closed end closure 12 and maintains it in its closed position until it reaches position C. A second hold-down rail extends from positions C to G to prevent the containers from falling off the respective mandrels 54. The vibrating means 62, as illustrated in FIG. 9, is also in the form of a concentrating horn of an ultrasonic transducer of the type shown in U.S. Pat. Nos. 3,432,691 and 3,526,792, as is the case with the horn 48 of FIG. 8. The transducer 60 includes a housing 64 for a converter for converting electrical energy into mechanical energy, and the concentrating horn 62 concentrates the mechanical energy into vibrations at a desired frequency.

The concentrating horn 62 is shown in its extended, operable position for engaging the outer surface of the layers of the bottom 12 of the carton, with the mandrel 54 at position C serving as a back-up means engaging the opposite outer surface of the layers of the bottom 12. The horn 62 is movable from its extended, operable position to a retracted inoperable position with respect to the position of the mandrel 54 at position C. Thus, the mandrels 54 are each movable from the operable position at position C, to inoperable positions with respect to the operable position of the horn 62. Conversely, the horn 62 is reciprocably movable from the operable position shown in FIG. 9 with respect to the mandrel at position C, to an inoperable retracted position to the left of the position shown in FIG. 9.

The shape and configuration of the horn is determined in accordance with the desired frequency of vibration to produce the desired amount of concentrated, frictional heat at the area to be welded together. In the preferred form to date, the horn 62 is designed to vibrate at a frequency of 20,000 cycles per second when it is in engagement with the outer surface of the bottom 12. The vibration of the horn 62 is converted into frictional heat which melts the thermoplastic coating of the layers of the panels making up the bottom 12 to weld the various layers together along the band 68 indicated by the shaded area in FIG. 5. Alternatively, as shown in FIG. 6, the bottom can be sealed along the edges by a sonic welding device such as the device 60 in an H-shaped pattern having a central bar on band 70 extending across the center of the bottom 12 as is the case with the band 68 in FIG. 5, together with leg bands 72 and 74 extending along the edges of the bottom 12 transversely to the central bar 70. In the latter case, the horn 62 may be of H-shaped cross-section.

In the illustrated embodiment of FIG. 9, each mandrel 54 is formed with cooling chambers in their outer ends 57. The cooling chambers are connected with a source of water, or other cooling liquid or fluid, through passages indicated by reference numerals 51. The construction of the mandrels 54, cooling chambers and passages may be the same as that disclosed in U.S. Pat. Nos. 3,120,089 or 3,239,995, for example.

Figure 10:
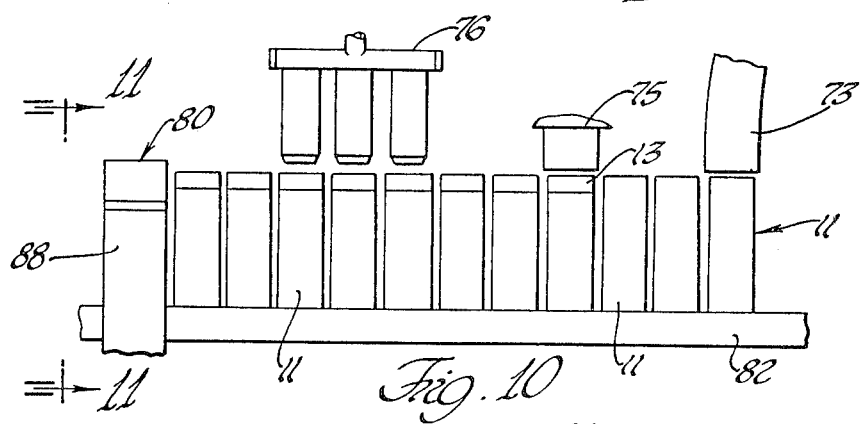
FIG. 10 is a side elevational view of a portion of apparatus for prebreaking the top end closures of the container, filling the container, and welding the top end closure to its closed, sealed condition.
Figure 11:
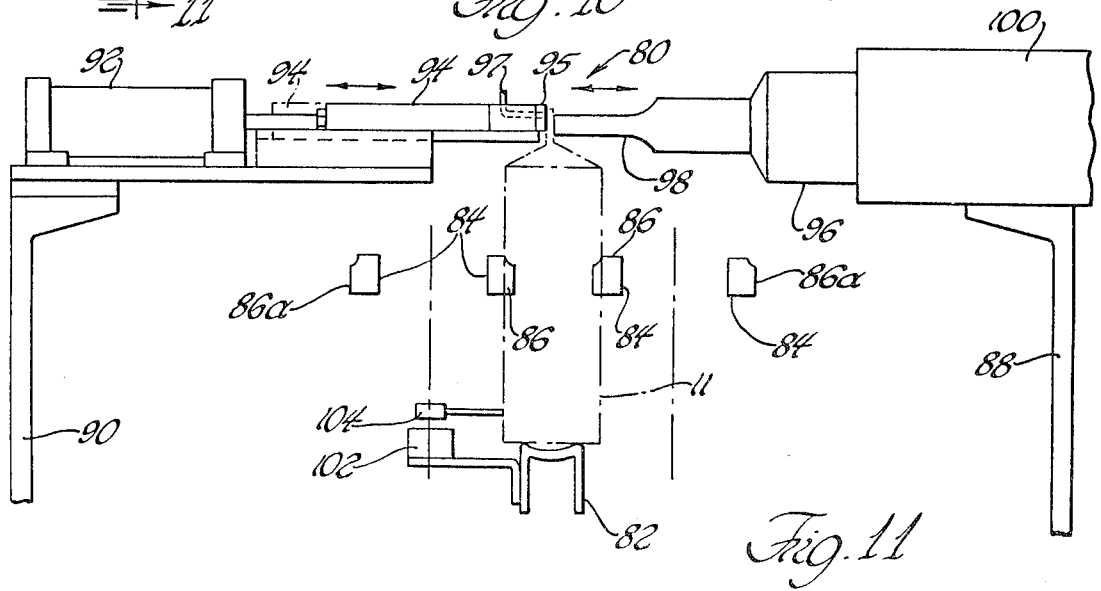
FIG. 11 is a view taken along lines 11—11 of FIG. 10.

When a container on the mandrel assembly 50 reaches the unloading position H in FIG. 9, it is transferred through a guide chute 73 to a conveying assembly illustrated in FIGS. 10 and 11. The container may be removed from the mandrel 54 at position H, and propelled through the chute 73 by pneumatic pressure, or in the manner disclosed in U.S. Pat. No. 3,239,995. The conveying assembly moves the containers 11 from the discharge end of the chute 73 at the right-hand end of FIG. 10 sequentially through a top breaking mechanism indicated diagrammatically by reference numeral 75, a filler assembly 76, and a welding station 80. The top breaker unit 75 and filler assembly 76 are also disclosed in the aforementioned U.S. Pat. No. 3,239,995, and their particular structural details form no part of the present invention.

The conveying assembly of FIGS. 10 and 11 includes an elongated support member 82 for supporting the cartons as the cartons are moved along the conveying line by endless conveyor chains 84 (FIGS. 11), the conveyor chains having fingers 86 for engaging the containers 11 to move the containers 11 along the support 82. The fingers 86a in FIGS. 11 indicate the fingers of the return runs of the conveyor chains 84. The conveyor assembly may be identical to the conveyor assembly of the apparatus shown in either of U.S. Pat. Nos. 3,120,089; 3,309,841 or 3,239,995. The conveyor chains are omitted from FIG. 10 for clarity of illustration.

As each container 11 advances toward the welding station 80, it is sequentially subjected to the operation of the top breaker 75 which operates to bend the panels of the open gabled closure portion 13 inwardly to approximately the position shown in FIG. 2, and the filling assembly 76 wherein the carton is filled with milk or other contents.

Located at the welding station, on opposite sides thereof, are support members 88 and 90 for respectively supporting a sonic welding assembly 96 and an anvil assembly 92. The anvil assembly 92 includes an anvil member 94 which is extendable to an operable position shown in full lines in FIG. 11 and is retractable to an inoperable position with respect to the sonic welding assembly as illustrated in the phantom line position in FIG. 11. The sonic welding assembly 96 may be identical to the assembly 60 of FIG. 9 and includes a concentrating vibrating horn 98 which is extendable to an operable position as shown in FIG. 11 and is retractable to an inoperable position located to the right of the position shown in FIG. 11.

The horn 98 and anvil 94 are caused to move between their respective operable and inoperable positions by control means operated by a switch 102 having an actuator 104 engageable by a container 11 when the container 11 is in the welding station. When a container 11 is not located at the welding station 80 in the position shown in FIG. 11, the anvil 94 and horn 98 are caused to retract to their inoperable positions wherein the anvil 94 is located to the left of its full line position to it phantom line position in FIG. 11, and wherein the horn 98 is retracted to the right of the position in which it is shown in FIG. 11 so that the anvil and horn 98 are spaced from each other. When a container 11 is moved by the conveyor 84 to the welding station 80, the container engages the actuator 104 which causes the horn 98 to engage the closure portion of the container on the right-hand side as viewed in FIG. 11, and the anvil 94 to extend toward the right to engage the container on the opposite side. Thus, the horn engages the outer surface of the layers of the top portion of the carton on one side, and the anvil 94 engages the outer surface of the layers of the closure portion of the carton on the other side. Actuation of the switch 102 by the actuating arm 104 when engaged by the container 11 energizes the sonic welding assembly 96 and causes the horn 98 to vibrate and generate frictional heat along the shaded bands 105 and 106 in FIG. 3.

A shown in FIG. 4, the configuration of the top closure portion of the container 11 is such that the ribs 34 and 44 form a double layer, while the panels 28, 29, 32 and 43 form four layers to be welded together. Moreover, at the area of the sealing flap 16, a fifth layer is formed which must be sealed together. Consequently, the anvil 94 in the area of the sealing flap 16 may be relieved to accommodate for the extra thickness so that uniform pressure will be applied between the horn and the anvil during the welding operation.

The anvil 94 is also provided with a cooling chamber in the end portion 95 connected with a source of water or other cooling liquid of fluid by a conduit 97, which may be flexible to permit movement of the anvil 94.

In the illustrated embodiment, the anvil 94 is indicated to be a single piece anvil having a configuration (FIG. 6) to accommodate the changing contour from rib 34 to panel 43, and similarly, the horn 98 is indicated to have a shape conforming to the changing contour from rib 44 to panel 32 due to the extra thickness between the panels 32 and 43 because of the panels 28 and 29 being sandwiched between panels 32 and 43. However, it is within the scope of the invention that a separate horn and anvil be utilized to weld the ribs 44 and 34 together, and a separate horn and anvil be utilized to weld the quadruple layer 43, 28, 29 and 32 together. The phantom lines in FIG. 4 indicate two horns and two anvils, one for the double thickness area, and another for the quadruple thickness area.

Extension and retraction of the anvil 94 and horn 98 may be accomplished by conventional hydraulic or electrical actuators controlled in such a manner that when a carton 11 is not in engagement with the actuator 104, the anvil 94 and horn 98 are actuated to their retracted, inoperable positions. When the carton 11 engages the actuator 104, the anvil 94 is caused to extend to the full line position shown in FIG. 11, and the horn 98 extends to the position shown in FIG. 11 and is energized to vibrate and, the mechanical vibration is converted into frictional heat to weld the top closure portion 13 together along the bands 105 and 106 of FIG. 3. With the horn vibrating at a frequency of 20,000 cycles per second (or 20Hz), sufficient heat is generated in a matter of microseconds to melt the thermoplastic and weld the layers located between the anvil and horn together, with the heat dissipated into the paperboard. The heat is concentrated along the bands 105 and 106 and is quickly dissipated to eliminate the necessity of the elaborate heat removal systems required in prior art packaging machines of this type.

Thus, FIG. 9 illustrates apparatus for welding at least two layers of thermoplastic coated paperboard together to form a sealed joint between the layers including back-up means 54 engageable with one outer surface of the paperboard layers (the layers making up the bottom 12 of the carton 11) and vibrating means 62 engageable with the opposite outer surface of the paperboard layers (again, the bottom 12 of the carton 11) when the other outer surface is engaged with the back-up means 54 to heat the thermoplastic coating of the paperboard layers and weld the layers together.

Similarly, FIG. 11 illustrates apparatus for welding at least two layers of thermoplastic coated paperboard together including back-up means 94 engageable with one outer surface of the paperboard layers 43, 34 and vibrating means 98 engageable with the opposite outer surface 32, 44 of the paperboard layers which, when energized, heats the thermoplastic coating of the paperboard and welds the layers 28, 29, 32, 34, 43 and 44 together.

The packaging machines illustrated utilizing the ultrasonic transducers for performing the welding operations eliminate the necessity for generating a large amount of heat for sealing the cartons, and the resulting problem of dissipating the large amount of heat generated for the heat sealing operation.

While specific forms of the invention have been illustrated in the accompanying drawings and described in the foregoing specification, it will be understood by those skilled in the art that the invention is not limited to the exact construction shown. To the contrary, various alterations in the construction and arrangement of parts, all falling within the scope and spirit of the invention, will be apparent to those skilled in the art.

The embodiments of the invention in which an exclusive property or privilege is claimed are defined as follows:

1. A method of forming from a flat blank a container of the type having a tubular body with first and second end closures at opposite ends of the tubular body, the second end closure in its open position having a pair of spaced, upstanding panels, said method comprising: wrapping the container blank around a side seam mandrel with the side edges of the blank overlapping; engaging the outer surface of the overlapping edges with vibrating means having a vibrating frequency sufficient to weld the overlapping edges together to form a side seam on the container blank so that the container blank can be formed into tubular configuration; placing the tubular container blank on a first end closure mandrel with the first end closure in its open position projecting from said first end closure mandrel; folding said first end closure to a flat closed condition in overlapping layers against the first end closure mandrel; engaging the outer surface of the overlapping layers of the flat end closure with vibrating means having a frequency sufficient to weld the overlapping layers together; transferring the tubular container with the welded flat end closure to a second end closure welding station; engaging the outer surface of one of said upstanding panels with a mandrel and the outer surface of the other of said upstanding panels with vibrating means; moving said last named vibrating means and mandrel toward each other to close said upstanding panels together; and vibrating said last named vibrating means at a frequency capable of generating heat sufficient to weld together said upstanding panels and any layers of container materials sandwiched between said upstanding panels to close and seal said second end closure.

2. Apparatus for forming from a flat blank a container of the type having a tubular body with first and second end closures at opposite ends of the tubular body, the second end closure in its open position having a pair of upstanding side panels, said apparatus comprising: a side seam mandrel around which a flat container blank can be wrapped with the side edges of the blank overlapping; side seam vibrating means engageable with the outer surface of the overlapping side edges and operable to generate heat sufficient to weld the overlapping edges together to form a side seam on the container blank so that the container blank can be formed into a tubular configuration; a first end closure mandrel receivable in the tubular body of the container blank with the first end portion of the tubular container blank in its open position projecting from said first end closure mandrel, flat end closure means for folding the projecting first end portion of the tubular container from its open position to a flat closed condition in overlapping layers against the end of the first end closure mandrel; first end closure vibrating means engageable with the outer surface of the overlapping layers of the flat end closure and operable to generate heat sufficient to weld the overlapping layers of said flat end closure together; a second end closure mandrel engageable with the outer surface of one of the side panels of the open second end closure; and second end closure vibrating means engageable with the outer surface of the other side panel of the open second end closure and operable in cooperation with the second end closure mandrel to close the side panels together between the second end closure mandrel and second end closure vibrating means and then generate sufficient heat to weld together the side panels and any layers of material sandwiched between the side panels.

3. Apparatus as claimed in claim 2 wherein said mandrels each include coolant means, and said vibrating means is each operable to sequentially (1) engage its respective container surface, (2) vibrate for a predetermined time to generate sufficient heat to cause the layers between the respective vibrating means and mandrels to flow, (3) stop vibrating and remain in a dwell position in engagement with its respective container surface for a predetermined time to permit the layers to cool and set, and (4) move out of engagement with it respective container surface.

4. Apparatus as claimed in claim 2 further including mounting means supporting said first end closure mandrel for movement with respect to said first end closure vibrating means.

5. Apparatus as claimed in claim 4 wherein said first end closure mandrel is supported on said mounting means for sequential movement between (1) a loading position for receiving a tubular body of a container subsequent to the side seam welding operation, (2) a closing position in operative relationship with said flat end closure means, (3) a welding position in operative relationship with said first end closure vibrating means, and (4) an unloading position in which the container with said first end closure closed and welded is removed from said first end closure mandrel.

6. Apparatus as claimed in claim 5 wherein said mounting means supports said first end closure mandrel for rotation between said loading, closing, welding and unloading positions.

7. Apparatus as claimed in claim 6 wherein said mounting means comprises a rotatable hub member with a plurality of radially projecting arms, each of said arms comprising a first end closure mandrel.

8. Apparatus as claimed in claim 7 further including a second end closure welding station; conveying means extending through said second end closure welding station; and transfer means for transferring a container from said unloading position and depositing the container on the inlet end of said conveying means to be conveyed through said second end closure welding station.

9. Apparatus as claimed in claim 8 wherein said second end closure vibrating means is located at said welding station on one side of the path of movement of said conveying means and said second end closure mandrel is located at said welding station on the other side of the path of movement of said conveying means in opposed relationship with said second end closure vibrating means.

10. Apparatus as claimed in claim 9 wherein said second end closure mandrel and vibrating means are mounted for movement between an inoperable position spaced from each other a distance greater than the space between the side panels of an open second end closure, and an operable position in which said second end closure mandrel and vibrating means engage the respective outer surfaces of said one and said other side panels for closing and welding the side panels together.

11. Apparatus as claimed in claim 10 further including power means for moving said second end closure mandrel and vibrating means between their respective operable and inoperable positions.

12. Apparatus as claimed in claim 11 further including container operated actuating means for said power means, said actuating means being engageable by a container on said conveying means as the container moves into said welding station to actuate said second end closure mandrel and vibrating means to their operable positions from their inoperable positions and to return to their inoperable positions upon completion of the welding operation on said second end closure.

13. Apparatus as claimed in claim 5 further including a second end closure welding station; conveying means extending through said second end closure welding station; and transfer means for transferring a container from said unloading position and depositing the container on the inlet end of said conveying means to be conveyed through said second end closure welding station.

14. Apparatus as claimed in claim 13 wherein said second end closure vibrating means is located at said welding station on one side of the path of movement of said conveying means and said second end closure mandrel is located at said welding station on the other side of the path of movement of said conveying means in opposed relationship with said second end closure vibrating means.

* * * * *